(12) United States Patent
Van Kessel

(10) Patent No.: US 9,586,183 B2
(45) Date of Patent: Mar. 7, 2017

(54) MEMBRANES

(71) Applicants: FUJIFILM MANUFACTURING EUROPE BV, Tilburg (NL); FUJIFILM IMAGING COLORANTS LIMITED, Blackley (GB)

(72) Inventor: Petrus Van Kessel, Tilburg (NL)

(73) Assignee: Fujifilm Manufacturing Europe BV (NL)

( * ) Notice: Subject to any disclaimer, the term of this patent is extended or adjusted under 35 U.S.C. 154(b) by 314 days.

(21) Appl. No.: 14/408,737

(22) PCT Filed: Jun. 26, 2013

(86) PCT No.: PCT/GB2013/051680
§ 371 (c)(1),
(2) Date: Dec. 17, 2014

(87) PCT Pub. No.: WO2014/001791
PCT Pub. Date: Jan. 3, 2014

(65) Prior Publication Data
US 2015/0190762 A1    Jul. 9, 2015

(30) Foreign Application Priority Data

Jun. 26, 2012  (GB) .................................. 1211309.8
Nov. 1, 2012   (GB) .................................. 1219665.5

(51) Int. Cl.
| | | |
|---|---|---|
| *B01D 53/22* | (2006.01) | |
| *B01D 71/70* | (2006.01) | |
| *B01D 69/10* | (2006.01) | |
| *B01D 69/12* | (2006.01) | |
| *B01D 71/02* | (2006.01) | |
| *B01D 71/16* | (2006.01) | |
| *B01D 71/52* | (2006.01) | |
| *B01D 71/64* | (2006.01) | |

(52) U.S. Cl.
CPC ........... *B01D 71/70* (2013.01); *B01D 53/228* (2013.01); *B01D 69/10* (2013.01); *B01D 69/127* (2013.01); *B01D 71/022* (2013.01); *B01D 71/024* (2013.01); *B01D 71/16* (2013.01); *B01D 71/52* (2013.01); *B01D 71/64* (2013.01); *B01D 2313/44* (2013.01); *B01D 2323/30* (2013.01)

(58) Field of Classification Search
CPC ...... B01D 71/70; B01D 53/228; B01D 69/10; B01D 69/127; B01D 71/022; B01D 71/024; B01D 71/16; B01D 71/52; B01D 71/64; B01D 2313/44; B01D 2323/30
See application file for complete search history.

(56) References Cited

U.S. PATENT DOCUMENTS

| | | | |
|---|---|---|---|
| 3,899,309 A | | 8/1975 | Hoehn et al. |
| 4,394,294 A | * | 7/1983 | Gryaznov ............ B01J 31/1633 502/158 |
| 4,484,935 A | | 11/1984 | Zampini |
| 4,717,394 A | | 1/1988 | Hayes |
| 4,933,082 A | | 6/1990 | Yamada et al. |
| 5,085,676 A | | 2/1992 | Ekiner et al. |
| 5,286,280 A | | 2/1994 | Chiou |
| 5,661,092 A | * | 8/1997 | Koberstein ............ B05D 1/208 427/226 |
| 5,666,642 A | * | 9/1997 | Hawthorne ............ C01D 17/00 210/638 |
| 6,432,376 B1 | * | 8/2002 | Choudhary .............. B01J 23/44 423/584 |
| 6,756,019 B1 | * | 6/2004 | Dubrow ............ B01L 3/502715 422/500 |
| 8,540,800 B2 | * | 9/2013 | Liu .................... B01D 67/0048 427/372.2 |
| 2004/0168981 A1 | * | 9/2004 | Dudziak ............... B01D 61/027 210/644 |
| 2005/0087491 A1 | * | 4/2005 | Hennige .............. B01D 53/228 210/640 |
| 2005/0204920 A1 | * | 9/2005 | Hong .................. B01D 53/228 96/4 |
| 2006/0088857 A1 | * | 4/2006 | Attiya .................... B01D 61/18 435/6.12 |
| 2007/0137485 A1 | * | 6/2007 | Bitterlich ............. B01D 53/228 96/11 |
| 2009/0007555 A1 | * | 1/2009 | Jensen ................. B01D 69/141 60/326 |
| 2010/0147745 A1 | * | 6/2010 | Den Boestert ....... B01D 61/027 208/91 |
| 2010/0189631 A1 | * | 7/2010 | Noszticzius ......... B01D 63/087 423/477 |
| 2010/0224551 A1 | * | 9/2010 | Hongo ................. B01D 63/087 210/454 |
| 2011/0020950 A1 | * | 1/2011 | Vogel ................... B01D 67/006 436/501 |
| 2011/0052466 A1 | * | 3/2011 | Liu ...................... B01D 53/228 423/230 |

(Continued)

FOREIGN PATENT DOCUMENTS

| | | |
|---|---|---|
| CN | 1 02489190 A | 6/2012 |
| EP | 107636 A1 | 5/1984 |
| JP | H02149323 A | 6/1990 |
| WO | 2007018425 A1 | 2/2007 |

OTHER PUBLICATIONS

International Preliminary Report on Patentability dated Jan. 8, 2015, issued from corresponding PCT/GB2013/051680.

*Primary Examiner* — Anthony Shumate
(74) *Attorney, Agent, or Firm* — Banner & Witcoff, Ltd.

(57) ABSTRACT

A composite membrane comprising: a. a porous support; b. a polymeric layer comprising dialkylsiloxane groups and a metal, the polymeric layer being present on the porous support; c. a discriminating layer present on the polymeric layer; and d. optionally a protective layer present on the discriminating layer wherein the polymeric layer has a molar ratio of metal:silicon of at least 0.0005.

20 Claims, No Drawings

(56) References Cited

U.S. PATENT DOCUMENTS

| | | | |
|---|---|---|---|
| 2011/0104021 A1* | 5/2011 | Curello | B01D 53/22 422/240 |
| 2012/0031833 A1* | 2/2012 | Ho | B01D 67/0051 210/488 |
| 2012/0196376 A1* | 8/2012 | Park | B81C 1/00071 436/94 |
| 2012/0297976 A1* | 11/2012 | Sano | B01D 53/22 95/47 |
| 2013/0149492 A1* | 6/2013 | Yoon | B01D 67/0032 428/137 |
| 2013/0189481 A1* | 7/2013 | Grosso | B01D 67/003 428/118 |
| 2014/0060324 A1* | 3/2014 | Ahn | B01D 53/228 95/51 |
| 2014/0137736 A1* | 5/2014 | Ahn | B01D 69/141 95/51 |

* cited by examiner

MEMBRANES

RELATED APPLICATION DATA

This application is a National Stage Application under 35 U.S.C. 371 of co-pending PCT application PCT/GB2013/051680 designating the United States and filed Jun. 26, 2013; which claims the benefit of GB application number 1219665.5 and filed Nov. 1, 2012; which claims the benefit of GB application number 1211309.8 and filed Jun. 26, 2012 each of which are hereby incorporated by reference in their entireties.

This invention relates to composite membranes and to their preparation and use for the separation of gases.

Composite membranes comprising a porous support, a gas-permeable polymeric layer (often referred to as a "gutter layer") and an outer discriminating layer are known in the art. Each of these components are important contributors to the overall performance of the membrane. The porous support provides the membrane with mechanical strength; the discriminating layer selectively allows some gases to permeate more quickly than others; while the gutter layer provides a smooth, gas permeable intermediate surface between the porous support and the discriminating layer.

Typically a mixture of gasses is brought into contact with one side of the composite membrane and at least one of the gases permeates through its discriminating layer faster than the other gas(es). In this way, the initial gas stream is separated into two streams, one of which is enriched in the selectively permeating gas(es) and the other of which is depleted.

The present invention aims to provide a rapid process for preparing composite membranes having good flux, selectivity and robustness.

According to a first aspect of the present invention there is provided a process for preparing a composite membrane comprising the steps:
(i) applying to a porous support a radiation-curable composition comprising a polymerisable dialkylsiloxane and a metal;
(ii) irradiating the radiation-curable composition on the support, thereby forming a polymeric layer comprising dialkylsiloxane groups and a metal on the porous support;
(iii) forming a discriminating layer on the polymeric layer; and
(iv) optionally forming a protective layer on the discriminating layer;
wherein the polymeric layer has a molar ratio of metal:silicon of at least 0.0005.

The polymeric layer comprising dialkylsiloxane groups and a metal is often abbreviated in this specification to simply 'the polymeric layer'.

Surprisingly the composite membranes according to the present invention have particularly good selectivity.

The radiation-curable composition may be applied to the porous support by any suitable coating technique, for example by curtain coating, meniscus type dip coating, kiss coating, pre-metered slot die coating, reverse or forward kiss gravure coating, multi roll gravure coating, spin coating and/or slide bead coating.

Conveniently the radiation-curable composition may be coated onto the porous support by a multilayer coating method, for example using a consecutive multilayer coating method, optionally along with the components used to form the discriminating layer In a preferred consecutive multilayer process a layer of the radiation-curable composition and the discriminating layer (or the chemicals used to prepare the discriminating layer) are applied consecutively to the support, with the radiation-curable composition being applied before the discriminating layer (or the chemicals used to prepare the discriminating layer).

The primary purpose of the porous support is to provide mechanical strength to the membrane without materially reducing gas flux. Therefore the porous support is typically open pored (before it is converted into the composite membrane), relative to the discriminating layer.

The porous support may be, for example, a microporous organic or inorganic membrane, or a woven or non-woven fabric. Preferably the porous support is organic. The porous support may be constructed from any suitable material. Examples of such materials include polysulfones, polyethersulfones, polyimides, polyetherimides, polyamides, polyamideimides, polyacrylonitrile, polycarbonates, polyesters, polyacrylates, cellulose acetate, polyethylene, polypropylene, polyvinylidenefluoride, polytetrafluoroethylene, poly(4-methyl 1-pentene) and especially polyacrylonitrile.

One may use a commercially available porous sheet material as the support, if desired. Alternatively one may prepare the porous support using techniques generally known in the art for the preparation of microporous materials. One may also use a porous support which has been subjected to a corona discharge treatment, glow discharge treatment, flame treatment, ultraviolet light irradiation treatment or the like, e.g. for the purpose of improving its wettability and/or adhesiveness.

The porous support preferably possesses pores which are as large as possible, consistent with providing a smooth surface for the polymeric layer.

The porous support preferably has an average pore size of at least about 50% greater than the average pore size of the discriminating layer (when present), more preferably at least about 100% greater, especially at least about 200% greater, particularly at least about 1000% greater than the average pore size of the discriminating layer (when present).

The pores passing through the porous support typically have an average diameter of 0.001 to 10 µm, preferably 0.01 to 1 µm. The pores at the surface of the porous support typically have a diameter of 0.001 to 0.1 µm, preferably 0.005 to 0.05 µm. The pore diameter may be determined by, for example, viewing the surface of the porous support before it is converted to the membrane by scanning electron microscopy ("SEM") or by cutting through the support and measuring the diameter of the pores within the porous support, again by SEM.

The porosity at the surface of the porous support may also be expressed as a % porosity, i.e.

$$\% \text{ porosity} = 100\% \times \frac{\text{(area of the surface which is missing due to pores)}}{\text{(total surface area)}}$$

The areas required for the above calculation may be determined by inspecting the surface of the porous support by SEM. Thus, in a preferred embodiment, the porous support has a % porosity >1%, more preferably >3%, especially >10%, more especially >20%.

The porosity of the porous support may also be expressed as a $CO_2$ gas permeance (units are $m^3(STP)/m^2 \cdot s \cdot kPa$). When the membrane is intended for use in gas separation the porous support preferably has a $CO_2$ gas permeance of 5 to $150×10^{-5}$ m³(STP)/m²·s·kPa, more preferably of 5 to 100, most preferably of 7 to $70×10^{-5}$ m³(STP)/m²·s·kPa.

Alternatively the porosity may be characterised by measuring the $N_2$ gas flow rate through the porous support. Gas flow rate can be determined by any suitable technique, for example using a Porolux™ 1000 device, available from Porometer.com. Typically the Porolux™ 1000 is set at the maximum pressure (about 34 bar) and one measures the flow rate (L/min) of $N_2$ gas through the porous support under test. The $N_2$ flow rate through the porous support at a pressure of about 34 bar for an effective sample area of 2.69 cm² (effective diameter of 18.5 mm) is preferably >1 L/min, more preferably >5 L/min, especially >10 L/min, more especially >25 L/min. The higher of these flow rates are preferred because this reduces the likelihood of the gas flux of the resultant membrane being reduced by the porous support.

The above pore sizes and porosities refer to the porous support before it has been converted into the composite membrane of the present invention.

The porous support preferably has an average thickness of 20 to 500 μm, preferably 50 to 400 μm, especially 100 to 300 μm.

The polymeric layer comprising dialkylsiloxane groups performs the function of providing a smooth and continuous surface for the discriminating layer, although in some embodiments it may also function as a discriminating layer.

The polymeric layer preferably has an average thickness 25 to 1200 nm, preferably 30 to 800 nm, especially 50 to 650 nm, e.g. 70 to 120 nm, 130 to 170 nm, 180 to 220 nm, 230 to 270 nm, 300 to 360 nm, 380 to 450 nm, 470 to 540 nm or 560 to 630 nm.

The thickness of the polymeric layer may be determined by cutting through the membrane and examining its cross section by SEM. The part of the polymeric layer which is present within the pores of the support is not taken into account.

The polymeric layer is preferably non-porous, i.e. any pores present therein have an average diameter <1 nm, although it is gas permeable and usually has low ability to discriminate between gases.

Preferably the composite membrane is not a mixed matrix membrane, i.e. preferably the polymeric layer is substantially free from inorganic particles, e.g. free from silicates.

Preferably the polymeric layer has groups which are bound to the metal (atom), for example by covalent bonding, ionic bonding and/or by hydrogen bonding, preferably by covalent bonding. The identity of such groups depend to some extent on the chemical composition of the polymeric layer and the identity of the metal, but typically such groups are selected from epoxy groups, oxetane groups, carboxylic acid groups, amino groups, hydroxyl groups and thiol groups. More preferably the polymeric layer comprises a polymer having carboxylic acid groups, epoxy groups, or oxetane groups, or a combination of two or more of such groups. Such a polymer may be formed on the porous support layer by a process comprising radiation curing of a radiation-curable composition.

The polymerisable dialkylsiloxane (which may alternatively be referred to as a polymerisable compound comprising dialkylsiloxane groups) is optionally a monomer having a dialkylsiloxane group or a polymerisable oligomer or polymer having dialkylsiloxane groups. For example, one may prepare the polymeric layer from a radiation-curable composition containing a partially crosslinked, radiation-curable polymer comprising dialkylsiloxane groups, as described in more detail below. Typical dialkylsiloxane groups are of the formula $-\{O-Si(CH_3)_2\}_n-$ wherein n is at least 1, e.g. 1 to 100. Poly(dialkylsiloxane) compounds having terminal vinyl groups are also available and these may be incorporated into the polymeric layer by a polymerisation processes.

Preferably the polymeric layer is free from groups of formula $Si-C_6H_5$.

In one embodiment the polymeric layer does not contain Sb and Ti in a molar ratio of 0.41. More preferably the polymeric layer does not contain Sb and Ti in a molar ratio from 0.40 to 0.42.

Preferably the polymeric layer comprises groups of formula $-O-CO-(CH_2)_n-Si-C(OR^1)_2-$ wherein n is from 1 to 3 (preferably 2) and $R^1$ is $C_{1-4}$-alkyl (preferably methyl). Such groups may be incorporated into the gutter layer through the use of appropriate monomers, for example monomers comprising two groups of formula $HO_2C-(CH_2)_n-Si-C(OR^1)_2-$ (wherein n and $R^1$ are as hereinbefore defined). Such monomers can act as crosslinking agents for polyepoxy compounds and are commercially available, for example X-22-162C from Shin-Etsu Chemical Co.

Irradiation of the curable composition (sometimes referred to as "curing" in this specification) may be performed using any source which provides the wavelength and intensity of radiation necessary to cause the radiation-curable composition to polymerise and thereby form the polymeric layer on the porous support. For example, electron beam, ultraviolet (UV), visible and/or infra red radiation may be used to irradiate (cure) the radiation-curable composition, with the appropriate radiation being selected to match the components of the composition.

Preferably irradiation of the radiation-curable composition used to form the polymeric layer begins within 7 seconds, more preferably within 5 seconds, most preferably within 3 seconds, of the radiation-curable composition being applied to the porous support.

Suitable sources of UV radiation include mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are UV emitting lamps of the medium or high pressure mercury vapour type. In addition, additives such as metal halides may be present to modify the emission spectrum of the lamp. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized.

Irradiation step (ii) may be performed before, during or after step (iii). For example, one may irradiate the radiation curable composition to form the polymeric layer and then apply the discriminating layer thereto. Alternatively, one may apply the radiation-curable composition to the porous support and apply the discriminating layer (or the chemicals used to prepare the discriminating layer) on top of the radiation-curable composition and then perform the irradiation step (ii) for both layers simultaneously.

In order to produce a sufficiently flowable composition for use in a high speed coating machine, the radiation-curable composition preferably has a viscosity below 4000 mPa·s when measured at 25° C., more preferably from 0.4 to 1000 mPa·s when measured at 25° C. Most preferably the viscosity of the radiation-curable composition is from 0.4 to 500 mPa·s when measured at 25° C. For coating methods such as slide bead coating the preferred viscosity is from 1 to 100 mPa·s when measured at 25° C. The desired viscosity is preferably achieved by controlling the amount of solvent in the radiation-curable composition and/or by appropriate selection of the components of the radiation-curable composition and their amounts.

In the multi-layer coating methods mentioned above, one may optionally apply a lower inert solvent layer to the porous support followed by applying the radiation-curable composition.

With suitable coating techniques, coating speeds of at least 5 m/min, e.g. at least 10 m/min or even higher, such as 15 m/min, 20 m/min, or even up to 100 m/min, can be reached. In a preferred embodiment the radiation-curable composition (and also the discriminating layer and protective layer, when present) is applied to the support at one of the aforementioned coating speeds.

The thickness of the polymeric layer on the support may be influenced by controlling the amount of curable composition per unit area applied to the support. For example, as the amount of curable composition per unit area increases, so does the thickness of the resultant polymeric layer. The same principle applies to formation of the discriminating layer and protective layer, when present.

While it is possible to prepare the membranes of the invention on a batch basis with a stationary porous support, it is much preferred to prepare them on a continuous basis using a moving porous support, e.g. the porous support may be in the form of a roll which is unwound continuously or the porous support may rest on a continuously driven belt. Using such techniques the radiation-curable composition can be applied to the porous support on a continuous basis or it can be applied on a large batch basis. Removal of any inert solvent present in the radiation-curable composition can be accomplished at any stage after the radiation-curable composition has been applied to the support, e.g. by evaporation.

Thus in a preferred process for making the membranes of the invention, the radiation-curable composition is applied continuously to the porous support by means of a manufacturing unit comprising a radiation-curable composition application station, curing is performed using an irradiation source located downstream from the radiation-curable composition application station to form a polymeric layer, the discriminating layer (when present) is formed on the polymeric layer by a discriminating layer application station, the protective layer (when present) is formed on the discriminating layer by a protective layer application station, and the resultant membrane is collected at a collecting station, wherein the manufacturing unit comprises a means for moving the porous support from the first to the last station (e.g. a set of motor driven pass rollers guiding the porous support through the coating line).

One may form the discriminating layer on the polymeric layer (the polymeric layer sometimes being called a "gutter layer") using analogous techniques to those described above for forming the polymeric layer on the porous support. Typically, however, one will select the coating conditions such that the discriminating layer is much thinner than the polymeric layer. For example one may apply to the polymeric layer a much thinner coating of a composition which forms the discriminating layer than was used to form the polymeric layer.

In order to form a discriminating layer, one may apply a mixture comprising an inert solvent and a polymer which forms a discriminating layer when the inert solvent evaporates. Typically such a polymer is a polyimide, especially a polyimide having —$CF_3$ groups. Polyimides comprising —$CF_3$ groups may be prepared by, for example, the general methods described in U.S. Pat. Reissue No. 30,351 (based on U.S. Pat. No. 3,899,309) U.S. Pat. No. 4,717,394 and U.S. Pat. No. 5,085,676. Typically one or more aromatic dianhydrides, preferably having —$CF_3$ groups, are condensed with one or more diamines. The diamine(s) and dianhydride(s) copolymerise to form an AB-type copolymer having alternating groups derived from the diamine(s) and dianhydride(s) respectively.

The surface of the polymeric layer is preferably activated by corona treatment, (atmospheric or vacuum) plasma treatment, flame treatment and/or ozone treatment. For the corona or plasma treatment generally an energy dose of 0.5 to 100 kJ/m$^2$ will be sufficient, for example about 1, 3, 5, 8, 15, 25, 45, 60, 70 or 90 kJ·m$^2$.

In order to achieve a good adhesion of the discriminating layer to the polymeric layer, the composition used to form the discriminating layer preferably comprises groups which are reactive with a surface component of the (activated) polymeric layer, for example epoxy groups, oxetane groups, carboxylic acid groups, sulphonic acid groups, hydroxyl groups, trialkoxysilyl groups or thiol groups. More preferably the composition used to form the discriminating layer comprises a polymer having carboxylic acid, hydroxyl and/or sulphonic acid groups, most preferably carboxylic acid groups.

If desired, the discriminating layer may be formed on the polymeric layer by a radiation curing process. In this case, one may apply the discriminating layer to the polymeric layer in an analogous manner to how the polymeric layer was applied to the porous support, but applying a thinner layer and using a curable composition which results in a layer which can discriminate between gases.

One may locate a radiation-curable composition application station at an upstream position relative to an irradiation source and the irradiation source may be located at an upstream position relative a discriminating layer application station (when present).

While it is preferred for the polymeric layer to be pore-free, in composite membranes comprising a discriminating layer the presence of some pores usually does not reduce the permselectivity of the final membrane because the discriminating layer is often able to fill minor defects in the polymeric layer.

Preferably the discriminating layer comprises a polyimide, cellulose acetate, polyethyleneoxide or polyetherimide, especially a polyimide comprising trifluoromethyl groups.

Preferably the discriminating layer comprises groups of the Formula (1) wherein Ar is an aromatic group and R is a carboxylic acid group, a sulphonic acid group, a hydroxyl group, a thiol group, an epoxy group or an oxetane group:

Formula (1)

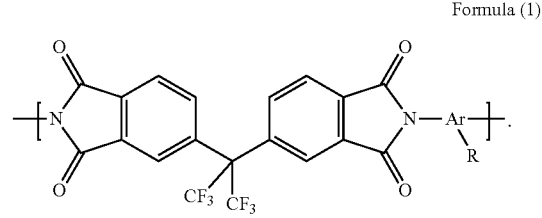

The average thickness of the discriminating layer is preferably 20 nm to 2 μm, more preferably 30 nm to 1 μm, especially 40 to 200 nm.

If desired one may form a protective layer on the discriminating layer (when present). The protective layer is preferably highly permeable to the gases or vapours that are to be separated. Preferably the protective layer comprises dialkylsiloxane groups and/or a polyamine. The protective layer optionally has surface characteristics which influence the functioning of the composite membrane, for example by making the membrane surface more hydrophilic. The function of the protective layer is to protect the discriminating layer against damage and/or to seal any defects present in the discriminating layer.

The average thickness of the protective layer is preferably 20 nm to 1 µm, more preferably 30 nm to 0.8 µm, especially 40 nm to 0.5 µm.

In a preferred embodiment the composition used to form the protective layer is identical to the composition used to form the polymeric layer.

In another embodiment the protective layer comprises a polyamine and the discriminating layer comprises carboxylic acid groups. This embodiment is preferred because the presence of amine groups in the protective layer can improve its adhesion to the discriminating layer containing carboxylic acid groups. Thus the process is preferably performed such that carboxylic acid groups present in the discriminating layer are reacted with amine groups present in the protective layer. Such a reaction may be performed under mild conditions if desired, whereby non-covalent bonding between said carboxylic acid groups and amine groups occurs. Typically optional step (iv) is performed at a temperature not exceeding 49° C., more preferably not exceeding 45° C., especially at temperature in the range 5 to 40° C., more especially 10 to 30° C.

The protective layer preferably comprises at least 0.1 wt % polyamine, e.g. 0.1 to 20 wt %, more preferably 0.25 to 15 wt %, especially 0.5 to 10 wt % of polyamine.

The protective layer is preferably formed from a composition comprising at least 0.1 wt % polyamine, e.g. 0.1 to 20 wt %, more preferably 0.25 to 15 wt %, especially 0.5 to 10 wt % of polyamine. The identity of the remainder of the composition is not particularly critical, although typically it comprises water and optionally one or more water-miscible organic solvents (e.g. ethanol, methanol, isopropanol and/or n-methyl pyrrolidinone).

The polyamine (whether used in the discriminating layer or the protective layer) preferably has 2, 3 or 4 amine groups, preferably 2 to 4 groups selected from the group consisting of primary amine groups and secondary amine groups.

The amine groups present in the polyamine may be, for example, in-chain (e.g. as in —CH$_2$—NH—CH$_3$), terminal (e.g. as in —CH$_2$—NH$_2$ or —C$_6$H$_4$—NH$_2$), or form part of a ring (e.g. as in —CH(CH$_2$CH$_2$)$_2$NH or pyridinyl (—O$_5$H$_4$N)), or a combination of two or more of such groups.

Preferably the polyamine contains amine groups which are quite close together, for example at least two amine groups of the polyamine are 3, 4, 5, 6 or 7 bonds apart. For example, in 1,2-diaminoethane the amine groups are 3 bonds apart (N—C—C—N) and in hexamethylene diamine the amine groups are 7 bonds apart (N—C—C—C—C—C—N). Preferably at least two amine groups of the polyamine are less than 8 bonds apart, more preferably 6 bonds apart, especially 5 bonds apart, more especially 4 bonds apart, particularly 3 bonds apart. The polyamine preferably has an Mw below 300, more preferably below 250, especially below 200.

Examples of suitable polyamines having a Mw below 300 include unbranched aliphatic diamines (e.g. 1,2-diaminoethane, 1,3-diaminopropane, 1,4-diaminobutane, 1,5-diaminopentane and 1,6-diaminohexane); branched aliphatic diamines (e.g. 1,2-diaminopropane and diaminocyclohexane); xylylenediamines (e.g. ortho- meta- and para-xylylenediamine); aromatic diamines (e.g. ortho- meta- and para-phenylenediamine, 4-bromobenzene-1,3-diamine and 2,5-diaminotoluene); amines with two or more aromatic rings (e.g. 4,4'-diaminobiphenyl and 1,8-diaminonaphthalene); N-substituted diamines (e.g. N,N'-methyl phenylenediamine); triamines (e.g. diethylenetriamine and bis(hexamethylene)triamine; and tetraamines (e.g triethylene tetramine and hexamethylene tetramine).

The radiation-curable composition used to form the polymeric layer preferably comprises:
(1) 0.5 to 25 wt % of radiation-curable component(s), at least one of which comprises dialkylsiloxane groups;
(2) 0 to 5 wt % of a photo-initiator;
(3) 70 to 99.5 wt % of inert solvent; and
(4) 0.01 to 5 wt % of metal complex;
wherein the composition has a molar ratio of metal:silicon of at least 0.0005.

Preferably the composition (and the polymeric layer) has a molar ratio of metal:silicon of 0.001 to 0.1, more preferably 0.003 to 0.03.

Preferably the radiation-curable composition used to form the polymeric layer comprises 0.02 to 0.6 mmol (more preferably 0.03 to 0.3 mmol) of component (4) per gram of component (1).

The molar ratio of metal:silicon of the polymeric layer is generally the same as the molar ratio of metal:silicon of the composition used to form the polymeric layer. Thus one may calculate the molar ratio of metal:silicon from the composition used to form the polymeric layer.

For convenience, one may determine the number of moles of silicon per gram of polymeric layer (Total Mol$_{si}$/g) by adding together the weight average number of moles of silicon in each polymerisable component used to form the polymeric layer. This calculation is illustrated in the Examples section below.

One may determine the number of moles of metal per gram of polymeric layer (Total Mol$_{metal}$/g) by adding together the weight average number of moles of metal in each metal-containing component used to form the polymeric layer The molar ratio of metal:silicon is then (Total Mol$_{metal}$/g)/(Total Mol$_{si}$/g).

The radiation-curable component(s) of component (1) typically comprise at least one radiation-curable group. Radiation curable groups include ethylenically unsaturated groups (e.g. (meth)acrylic groups (e.g. CH$_2$═CR$^1$—C(O)— groups), especially (meth)acrylate groups (e.g. CH$_2$═CR$^1$—C(O)O— groups), (meth)acrylamide groups (e.g. CH$_2$═CR$^1$—C(O)NR$^1$— groups), wherein each R$^1$ independently is H or CH$_3$) and especially oxetane or epoxide groups (e.g. glycidyl and epoxycyclohexyl groups).

In a preferred embodiment, component (1) of the radiation-curable composition comprises a partially crosslinked, radiation-curable polymer comprising dialkylsiloxane groups. The term 'curing' and the term 'crosslinking' are often used interchangeably throughout this document.

For brevity, the abovementioned partially crosslinked, radiation-curable polymer comprising dialkylsiloxane groups is often abbreviated below to "the PCP Polymer".

If desired, one may prevent the curable composition from permeating deeply into the porous support by any of a number of techniques. For example, one may select a curable composition which has a sufficiently high viscosity to make such permeation unlikely. With this in mind, the radiation-curable composition preferably has a viscosity of 0.1 to 500 Pa·s at 25° C., more preferably 0.1 to 100 Pa·s at 25° C.

Alternatively, the process optionally comprises the step of filling the pores of the porous support with an inert liquid before applying the radiation-curable composition to the porous support. This technique has an advantage over the first technique mentioned above in that one may form thinner membranes and more application techniques are available for radiation curable compositions of lower viscosity.

Another option for ensuring the curable composition does not permeate excessively into the porous support is to increase the hydrodynamic radius ($R_{hyd}$) of the PCP polymer. $R_{hyd}$ may be increased by increasing the extent to which the radiation-curable polymer is crosslinked. $R_{hyd}$ can be suitably determined by dynamic light scattering.

Preferably the $R_{hyd}$ of the PCP Polymer is more than half the average diameter of at least 50% of the pores at the surface of the porous support. Some degree of permeation is preferred to achieve a good adhesion.

The process of the present invention optionally comprises the step of preparing the PCP Polymer. For example, one may partially cure a composition comprising one or more curable components (e.g. monomers, oligomers and/or polymers), at least one of which comprises dialkylsiloxane groups. Preferably the partial cure is performed by a step polymerisation process.

In a preferred embodiment, at least one of the curable components used to make the PCP Polymer comprises a group which is both thermally curable and radiation curable. This is because one may then use a thermally initiated process for preparing the PCP Polymer and subsequently use a radiation initiated process to form the polymeric layer in step (ii).

Alternatively, the thermally curable group and the radiation curable groups are different groups and are part of the same component used to from the PCP Polymer.

If desired one may partially cure the curable components thermally to form the PCP Polymer, then stop or slow down the thermal cure process, then apply a composition containing the PCP Polymer to the support (step (i)) in the form of a composition comprising a metal complex and an inert solvent, and then irradiate the composition on the support to form the polymeric layer (step (ii)). The thermal cure process may be stopped or slowed down simply by cooling (e.g. to below 30° C.) and/or diluting the composition used to make the PCP Polymer and/or by removing the catalyst if present at an appropriate time. The use of two distinct curing mechanisms, one for forming the PCP Polymer and another for curing the radiation-curable composition to form the polymeric layer, makes the process flexible and suitable for large scale production of composite membranes.

Groups which are curable both thermally and by irradiation include epoxy groups and ethylenically unsaturated groups such as (meth)acrylic groups, e.g. (meth)acrylate groups and (meth)acrylamide groups.

Typically the components used to form the PCP Polymer are selected such that they are reactive with each other. For example, a component having an epoxy group is reactive with a component comprising, for example, an amine, alkoxide, thiol or carboxylic acid group. One or more of the components used to form the PCP Polymer may also have more than one curable group. Components having an ethylenically unsaturated group may be reacted with other components by a free radical mechanism or, alternatively, with a nucleophilic component having for example one or more thiol or amine groups.

The PCP Polymer is preferably obtained by partially curing (e.g. thermally) a composition comprising:
 (A) a component which is both thermally curable and radiation curable and which comprises one or more dialkylsiloxane groups;
 (B) a crosslinking agent which is copolymerisable with component (A) when heated;
 (C) inert solvent; and optionally
 (D) a catalyst.

Preferably the amount of inert solvent present in the composition used to form the PCP Polymer is from 5 to 95 wt %, more preferably 10 to 80 wt %, especially 20 to 60 wt %, e.g. 30 wt %, 40 wt % or 50 wt %, relative to the total weight of the composition used to form the PCP Polymer. For convenience, the inert solvent present in the above composition may also act as the inert solvent present in the radiation-curable composition used in step (i) of the present process.

Component (A) preferably comprises at least three radiation-curable groups per molecule.

The alkyl groups in the dialkylsiloxane groups are preferably each independently $C_{1-4}$-alkyl groups, especially methyl groups.

Preferably component (A) is free from phenyl siloxane groups (e.g. of formula —$(Si(Ph)_2$-O)— wherein Ph is a phenyl or phenylene group).

Component (A) preferably has a number average molecular weight ("NAMW"), of 1 to 500 kDa, preferably 1 to 100 kDa, especially 2 to 50 kDa. The NAMW may be determined by any technique known in the art such as dynamic light scattering or size exclusion chromatography.

Component (A) is preferably present in an amount of 1 to 95 wt %, more preferably 5 to 75, especially 20 to 60 wt %, relative to the weight of the composition used to make the PCP Polymer.

As examples of component (A) there may be mentioned polydimethylsiloxane epoxy (meth)acrylates, polydimethylsiloxane (meth)acrylates, and allyl modified, vinyl modified, (meth)acrylic modified, epoxy-modified polydimethylsiloxanes and mixtures comprising two or more thereof.

Component (A) may also comprise several different radiation-curable components comprising one or more dialkylsilane groups.

Component (A) preferably has a kinematic viscosity of 15 to 17,000 mm$^2$/s at 25° C., more preferably 25 to 4,500 mm$^2$/s at 25° C. Component (A) also comprises one or more thermally curable groups. This is so that component (A) can cure thermally to provide the PCP Polymer. The identity of the thermally curable group(s) is not particularly limited and includes, for example epoxy groups, oxetane groups, ethylenically unsaturated groups, benzoxazine groups, naphthoxazine groups, hydroxyl groups, isocyanate groups, propargyl groups, ethynyl groups and acetylene groups. Ethylenically unsaturated groups or epoxy groups may also be used to ensure the resultant PCP Polymer is radiation-curable.

The identity of the radiation-curable group(s) is not particularly limited and includes, for example, epoxy groups, oxetane groups or ethylenically unsaturated groups such as allylic, vinylic and (meth)acrylic groups.

The thermal cure step used to make the PCP Polymer, when performed, preferably takes place at a temperature in the range 60 to 200° C., more preferably 75 to 125° C. The thermal cure reaction may be stopped by cooling and/or diluting the thermally-curable composition and/or removing the catalyst as described above to give the desired PCP Polymer. For dilution, preferably the same material is used as component (C).

The crosslinking agent is useful for increasing the hydrodynamic radius of the resultant PCP Polymer, for example to a size which is greater than the average pore size at the surface of the porous support. In this way, penetration of the PCP Polymer into the pores of the porous support is reduced without having to prior-impregnate the porous support with an inert solvent.

Examples of crosslinking agents which may be used as component (B) include: polydimethylsiloxane comprising two or more reactive groups, for example two or more groups selected from carboxylic acid, hydroxyl, thiol and/or anhydride groups, preferably polydimethylsiloxane having at least two of such groups (e.g. at both ends); (cyclo) aliphatic or aromatic di-, tri- or poly-carboxylic acids, e.g. succinic acid, glutaric acid, adipic acid, suberic acid, azelaic acid, sebacic acid, 1,2-benzenedicarboxylic acid, 1,3-benzenedicarboxylic acid, 1,4-benzenedicarboxylic acid, trimesic acid; (cyclo)aliphatic or aromatic di-, tri- or poly-thiols, e.g. 1,2-ethanedithiol, 1,4-butanedithiol, 1,6-hexanedithiol, benzene-1,2-dithiol, benzene-1,3-dithiol, benzene-1,4-dithiol, 1,2-benzenedimethanethiol, 1,3-benzenedimethanethiol, 1,4-benzenedimethanethiol or toluene-3,4-dithiol; (cyclo)aliphatic or aromatic di-, tri- or poly-amines, e.g. ethylenediamine, 1,2-diaminopropane, 1,3-diaminopropane, 1,4-diaminobutane, cadaverine, hexamethylenediamine, 1,8-diaminooctane, 1,2-bis(3-aminopropylamino)ethane, 1,2-diaminocyclohexane, 4-aminobenzylamine, o-xylylenediamine, o-phenylenediamine, m-phenylenediamine, p-phenylenediamine; or (cyclo)aliphatic or aromatic anhydrides, e.g. succinic anhydride, 3,3-dimethylglutaric anhydride, ethylenediaminetetraacetic dianhydride, glutaric anhydride, phenylsuccinic anhydride, pyromellitic dianhydride, or phthalic anhydride; metal alkoxides, e.g. alkoxides of zirconium, titanium or niobium, especially titanium (IV) isopropoxide, titanium (IV) ethoxide, zirconium propoxide and/or niobium ethoxide. Preferably the crosslinking agent comprises two (i.e. two and not more than two) reactive groups.

When component (B) is or comprises a metal complex it may also serve as the metal complex mentioned in the first aspect of the present invention.

The function of the inert solvent (C) is to provide the composition used to make the PCP Polymer with a concentration suitable for the thermal crosslinking reaction to proceed efficiently and/or to control the viscosity of the composition. Typically the inert solvent used as component (C) comprises one or more organic solvents, especially water-immiscible organic solvent(s). The inert solvent is referred to as "inert" because it is not curable.

As examples of inert solvents there may be mentioned: $C_5$-$C_{10}$ (cyclo)alkanes, benzene, alkylbenzenes (e.g. toluene), $C_3$-$C_{10}$ (optionally branched) ketones, $C_4$-$C_{10}$ cyclic ketones, $C_4$-$C_{10}$ (optionally branched) esters, $C_4$-$C_{10}$ cyclic esters, $C_4$-$C_{10}$ (optionally branched) ethers, $C_4$-$C_{10}$ cyclic ethers and especially n-heptane and n-octane. Preferably the inert solvent comprises one or more, especially from 1 to 8, of the abovementioned preferred inert solvents.

Suitable catalysts (D) include, for example, amine, phosphonium and metal compounds, e.g. amines such as 2-ethylhexylamine, bis(2-ethylhexyl)amine, dodecyldimethylamine, n,n-dimethylbenzylamine, 2-ethylimidazole, 1,8-diazabicyclo[5.4.0]undec-7-ene, tetramethyl guanidine, tetrabutylammonium chloride, benzyltrimethyl ammonium bromide, benzyltrimethyl ammonium hydroxide, tetrabutyl ammonium hydroxide, crosslinked polyvinylpyridine, and polymer bound amines such as polymer bound 1,4-diazabicyclo[2.2.2]octane hydrochloride, polymer bound 1,8-diazabicyclo[5.4.0] undec-7-ene and polymer bound tetraalkylammonium carbonate; phosphonium compounds such as tetrabutyl phosphonium bromide, pentyltriphenylphosphonium bromide, polymer bound triphenylphosphonium chloride; metal compounds such as titanium (iv) isopropoxide, diisopropoxytitanium-bis-(acetylacetonate), titanium (iv) 2-ethylhexyloxide, titanium (iv) butoxide, titanium butylphosphate, zirconium (iv) propoxide, zirconium (iv) ethoxide, zirconium (iv) acetylacetonate, zirconium (iv) bis(diethyl citrato)-dipropoxide, niobium ethoxide, aluminum acetylacetonate, aluminum lactate, bismuth octoate, calcium octoate, cerium naphthenate, chromium (iii) 2-ethylhexanoate, cobalt octoate, copper (ii) acetylacetonate, iron (iii) acetylacetonate, magnesium 2,4-pentadionate, manganese naphthenate, nickel acetylacetonate, stannous octoate, titanium ethyl acetoacetate chelate, titanium acetylacetonate chelate, titanium triethanolamine chelate, zinc acetate, zinc acetylacetonate, zinc di-2-ethylhexyldithio-phosphate, zinc nitrate, zinc octoate, zirconium 6-methylhexanedione, zirconium octoate, zirconium (iv) trifluoroacetylacetone, and the like. Catalysts generally are used in concentrations ranging from about 0.004 to about 1 wt %, preferably from about 0.01 to about 0.5 wt %, relative to the total weight of curable components. The low amount of catalyst usually corresponds with a metal:silicon ratio of lower than 0.0001.

The preferred ethylenically unsaturated groups are acrylic (acrylate or acrylamide) groups because of their fast polymerisation rates, especially when the irradiation uses UV light. Many compounds having acrylic groups are also readily available from commercial sources.

The amount of radiation-curable component(s) present in the radiation-curable composition (i.e. component (1)) is preferably 1 to 20 wt %, more preferably 2 to 15 wt %.

Photo-initiators may be included in the radiation-curable composition and are usually required when the curing uses UV radiation. Suitable photo-initiators are those known in the art such as radical type, cation type or anion type photo-initiators.

Cationic photo-initiators are preferred when the radiation-curable component(s) comprises curable groups such as epoxy, oxetane, other ring-opening heterocyclic groups or vinyl ether groups.

Preferred cationic photo-initiators include organic salts of non-nucleophilic anions, e.g. hexafluoroarsinate anion, antimony (V) hexafluoride anion, phosphorus hexafluoride anion and tetrafluoroborate anion. Commercially available cationic photo-initiators include UV-9380c, UV-9390c (manufactured by Momentive performance materials), UVI-6974, UVI-6970, UVI-6990 (manufactured by Union Carbide Corp.), CD-1010, CD-1011, CD-1012 (manufactured by Sartomer Corp.), Adekaoptomer™ SP-150, SP-151, SP-170, SP-171 (manufactured by Asahi Denka Kogyo Co., Ltd.), Irgacure™ 250, Irgacure™ 261 (Ciba Specialty Chemicals Corp.), CI-2481, CI-2624, CI-2639, CI-2064 (Nippon Soda Co., Ltd.), DTS-102, DTS-103, NAT-103, NDS-103, TPS-103, MDS-103, MPI-103 and BBI-103 (Midori Chemical Co., Ltd.). The above mentioned cationic photo-initiators can be used either individually or in combination of two or more.

Radical Type I and/or type II photo-initiators may also be used when the curable group comprises an ethylenically unsaturated group, e.g. a (meth)acrylate or (meth)acrylamide.

Examples of radical type I photo-initiators are as described in WO 2007/018425, page 14, line 23 to page 15, line 26, which are incorporated herein by reference thereto.

Examples of radical type II photo-initiators are as described in WO 2007/018425, page 15, line 27 to page 16, line 27, which are incorporated herein by reference thereto.

For (meth)acrylic groups type I photo-initiators, especially alpha-hydroxyalkylphenones, such as 2-hydroxy-2-methyl-1-phenyl propan-1-one, 2-hydroxy-2-methyl-1-(4-tert-butyl-) phenylpropan-1-one, 2-hydroxy-[4'-(2-hydroxypropoxy)phenyl]-2-methylpropan-1-one, 2-hydroxy-1-[4-(2-hydroxyethoxy)phenyl]-2-methyl propan-1-one, 1-hydroxycyclohexylphenylketone and oligo[2-hydroxy-2-methyl-1-{4-(1-methylvinyl)phenyl}propanone], alpha-aminoalkylphenones, alpha-sulfonylalkylphenones and acylphosphine oxides such as 2,4,6-trimethylbenzoyl-diphenylphosphine oxide, ethyl-2,4,6-trimethylbenzoyl-phenylphosphinate and bis(2,4,6-trimethylbenzoyl)-phenylphosphine oxide, are preferred.

The amount of photo-initiator present in the radiation-curable composition (i.e. component (2)) is preferably 0.005 to 2 wt %, more preferably 0.01 to 1 wt %.

Preferably the weight ratio of component (2) to (1) in the radiation-curable composition is between 0.001 and 0.2 to 1, more preferably between 0.002 and 0.1 to 1. A single type of photo-initiator may be used but also a combination of several different types.

When no photo-initiator is included in the radiation-curable composition, the composition can be advantageously cured by electron-beam exposure. Preferably the electron beam output is between 50 and 300 keV. Curing can also be achieved by plasma or corona exposure.

The function of the inert solvent (3) is to provide the radiation-curable composition with a viscosity suitable for the particular method used to apply the curable composition to the porous support. For high speed application processes one will usually choose an inert solvent of low viscosity. Examples of suitable inert solvents are mentioned above in relation to preparation of the PCP Polymer.

The amount of inert solvent present in the radiation-curable composition (i.e. component (3)) is preferably 70 to 99.5 wt %, more preferably 80 to 99 wt %, especially 90 to 98 wt %.

Inert solvents are not radiation-curable.

The metal complex included in the radiation-curable composition as component (4) can provide the necessary metal in that composition and in the polymeric layer.

The metal is preferably selected from the groups 2 to 16 of the periodic table (according the IUPAC format), including transition metals. Examples of such metals include: Be, Mg, Ca, Sr, Ba, Sc, Y, La, Ce, Pr, Nd, Pm, Sm, Eu, Gd, Tb, Dy, Ho, Er, Tm, Yb, Lu, Ti, Zr, Hf, V, Nb, Ta, Cr, Mo, W, Mn, Re, Fe, Ru, Os, Co, Rh, Ir, Ni, Pd, Pt, Cu, Zn, Cd, B, Al, Ga, In, Tl, Si, Ge, Sn, Pb, As, Sb, Bi, Se, Te. More preferred are Mg, Ca, Sr, Ba, Sc, Y, La, Ce, Pr, Nd, Sm, Gd, Dy, Ho, Er, Tm, Yb, Ti, Zr, Hf, V, Nb, Ta, Cr, Mo, W, Mn, Fe, Ru, Co, Ir, Ni, Zn, B, Al, Ga, In, Si, Ge, Sn, As, Sb, Bi, Se and Te and mixtures comprising two or more thereof (the phrase "a metal" is not intended to be limited to just one metal and includes the possibility of two or more metals being present). Preferably the metal is not platinum. When determining the a metal:silicon ratio experimentally, silicon is not regarded as a metal.

From commercial availability point of view, metals from the groups 3, 4, 5, 13 and/or 14 of the periodic table are preferred, more preferably Ti, Zr, V, Nb, Al, Ce and Sn, especially metals from group 4 and 5, e.g. Ti, Zr, Hf, V and Nb.

The metal preferably has a positive charge of at least two, more preferably the metal is trivalent (charge of $3^+$), tetravalent (charge of $4^+$) or pentavalent (charge of $5^+$).

The metal complex, when used, may also comprise two or more different metal ions, e.g. as in barium titanium alkoxide, barium yttrium alkoxide, barium zirconium alkoxide, aluminum yttrium alkoxide, aluminum zirconium alkoxide, aluminum titanium alkoxide, magnesium aluminum alkoxide, aluminum zirconium alkoxide and lithium tantalum alkoxide.

The metal complex preferably comprises a metal (e.g. as described above) and a halide or an organic ligand, for example an organic ligand comprising one or more donor atoms which co-ordinate to the metal. Typical donor atoms are oxygen, nitrogen and sulphur, e.g. as found in hydroxyl, carboxyl, ester, amine, azo, heterocyclic, thiol, and thioalkyl groups.

The ligand(s) may be monodentate or multidentate (i.e. the ligand has two or more groups which co-ordinate with the metal).

In a particularly preferred embodiment the metal complex comprises a metal and an organic ligand comprising an alkoxide and/or an optionally substituted 2,4-pentanedionate group and/or a carboxyl group (e.g. a neodecanoate group).

The metal complex may also comprise one or more inorganic ligands, in addition to the organic ligand(s), and optionally one or more counterions to balance the charge on the metal. For example the metal complex may comprise a halide (e.g. chloride or bromide) or water ligand.

Preferably the metal complex has a coordination number of 2 to 6, more preferably 4 to 6 and especially 4 or 6.

Preferably the organic ligand is one which can be easily removed from the surface of the polymeric layer by drying or washing after the polymeric layer has been formed. The parts of the metal complex which are not at or near the surface of the polymeric layer may remain within the polymeric layer even after it has been washed.

When the metal in the polymeric layer is derived from a metal complex, some or all of the ligand present in the complex is usually replaced by ligating groups present in the polymeric layer. When the metal complex comprises tri- or higher-valent metal then ligating groups present in the polymeric layer are less likely to replace all the original ligands than when the metal has a valency of less than three.

Preferably the metal complex comprises an organic ligand having a molecular weight below 150 Daltons, more preferably below 120 Daltons.

Examples of suitable organic ligands include compounds comprising groups selected from $C_{1-8}$-alkoxy groups (e.g. methoxy, ethoxy, propoxy, butoxy and hexoxy groups); hydroxyl groups; $C_{1-6}$-thioalkyl groups (e.g. —$SCH_3$, —$SCH_2CH_3$ and —$SCH_2CH_2CH_3$); thiol groups; 2,4-pentanedionate groups (e.g. hexafluoro-2,4-pentanedionate and 3,5-heptanedionate); carboxyl groups (e.g. 2-ethylhexanoate and neodecanoate); amine groups (e.g. an —$NH_2$ group or a secondary amino group (e.g. NH—($C_{1-6}$-alkyl group)) or a tertiary amino group (e.g. pyridinyl)); azo groups (—N=N—); aryloxy groups (e.g. an optionally substituted phenoxy or naphthyloxy group) and compounds comprising two or more of the aforementioned groups (e.g. triethanolamine). Particularly preferred groups are $C_{2-4}$-alkoxides, e.g. ethoxide, n-propoxide, isopropoxide, butoxide, methoxypropoxide and methoxyethoxide, 1,3 diketones, e.g. 2,4-pentanedionate (acetylacetonate) and acetoacetate groups, and derivatives thereof. Typically such groups are co-ordinated to the metal through one or more covalent bonds and/or lone pairs of electrons (e.g. as per the lone pair in -ö-).

Examples of preferred metal complexes include titanium tetra-isopropoxide, titanium tetraethoxide, titanium diisopropoxide bis(2,4-pentanedionate), titanium 2-ethylhexoxide, titanium n-propoxide, titanium (IV) butoxide, titanium (IV) ethyl acetoacetate, titanium (IV) acetylacetonate, titanium diisopropoxy bis(2-ethyl-1,3-hexanediolate, titanium diisopropoxy bisethylacetoacetate, titanium (IV) ethoxide isopropoxide bis(acetylactonate), titanium dibutoxy bis(triethanolaminate), titanium bis(triethanolamine)diisopropoxide, zirconium ethoxide, zirconium diisopropoxide bis(2,2, 6,6-tetra-methyl-3,5-heptanedionate), zirconium 2-ethylhexoxide, zirconium 2-methoxymethyl-2-propoxide, zirconium 2,4-pentanedionate, zirconium n-propoxide, zirconium isopropoxide, zirconium 3,5-heptanedionate, zirconium hexafluoro-2,4-pentanedionate, zirconium(IV) bis(diethyl citrato)dipropoxide, zirconium tributoxide monoacetylacetonate, zirconium dibutoxide bisacetylacetonate, zirconium butoxide trisacetylacetonate, zirconium tributoxide monoethylacetoacetate, zirconium dibutoxide bisethylacetoacetate, zirconium butoxide trisethylacetoacetate, zirconium tetraethylacetoacetate, zirconium tri-isopropoxy tetramethylheptanedionate dimer, hafnium (IV) n-butoxide, hafnium (IV) tert-butoxide, hafnium (IV) isopropoxide, vanadium (III) acetylacetonate, vanadium (V) oxytriisopropoxide, vanadyl acetylacetonate, vanadium (V) oxytripropoxide, vanadium (V) oxytriethoxide, niobium ethoxide, niobium n-butoxide, niobium isopropoxide, niobium n-propoxide, tantalum isopropoxide, tantalum ethoxide, tantalum tetraethoxy pentanedionate, aluminium ethoxide, aluminium s-butoxide, aluminium di-s-butoxide ethylacetoacetate, aluminium di-sec-butoxy acetylacetonate, aluminium diisopropoxide ethylacetoacetate, aluminium isopropoxide, aluminium (iii) 2,4-pentanedionate, aluminium trisethylacetoacetate, aluminium acetylacetonate bisethylacetoacetate, cerium isopropoxide, cerium 2,4-pentadienoate, cerium hexafluoroisopropoxide, bis(2-ethylhexanoate)tin and tetra(isopropoxy) tin.

Preferably the curable composition comprises 0.01 to 5 wt %, more preferably 0.01 to 2 wt %, especially 0.02 to 1 wt % of metal complex. The radiation-curable composition may contain other components, for example surfactants, surface tension modifiers, viscosity enhancing agents, biocides and/or other components capable of co-polymerisation with the other ingredients.

According to second aspect of the present invention there is provided a composite membrane comprising:
 a. a porous support;
 b. a polymeric layer comprising dialkylsiloxane groups and a metal, the polymeric layer being present on the porous support; and
 c. a discriminating layer present on the polymeric layer; and
 d. optionally a protective layer present on the discriminating layer
wherein the polymeric layer has a molar ratio of metal: silicon of at least 0.0005.

The preferences for the composite membrane and its components (e.g. a. to d., the metal and the silicon) are as described above in relation to the process.

The composite membrane preferably has a pure water permeability at 20° C. of less than $6.10^{-8}$ m$^3$/m$^2$·s·kPa, more preferably less than $3.10^{-8}$ m$^3$/m$^2$·s·kPa.

The overall dry thickness of the composite membrane is preferably 20 to 500 µm, preferably from 100 to 300 µm.

The composite membrane is preferably in tubular or, more preferably, in sheet form. Tubular forms of membrane are sometimes referred to as being of the hollow fibre type. Membranes in sheet form are suitable for use in, for example, spiral-wound, plate-and-frame and envelope cartridges.

The metal content may be determined by atomic absorption spectroscopy and the silicon content may be determined by EXAFS (Extended X-ray Absorption Fine Structure analysis). Both metal and silicon content may also be determined by X-ray fluorescence (XRF). If desired a calibration may be done by techniques such as Inductively Coupled Plasma Optical Emission Spectrometry (ICP-OES) or Inductively Coupled Plasma Mass Spectrometry (ICP-MS).

The polymeric layer preferably comprises photocured ingredients and optionally photoinitiator residues. Preferably the composite membrane has been obtained by the process according to the first aspect of the present invention.

According to a third aspect of the present invention there is provided a gas separation cartridge comprising a composite membrane according to the second aspect of the present invention.

A still further aspect of the present invention provides a gas separation module for separating a feed gas containing a target gas into a gas stream rich in the target gas and a gas stream depleted in the target gas, the module comprises a housing and one or more cartridges comprising a composite membrane according to the present invention.

Preferred gas separation modules comprise a composite membrane according to the present invention are in the form of a spiral-wound cartridge. Such spiral-wound cartridges preferably comprise spacers and outer impermeable support layers, the spacers being positioned on each side of the membrane and between the membrane and the impermeable support layer and thereby defining a feed channel on one side of the membrane and a permeate channel on the other side of the membrane, wherein the membrane, spacers and outer impermeable layers are wound in a spiral manner around a core.

The spacers are typically, but not necessarily, made from plastic mesh or netting, which helps to promote turbulent flow in the gas channels. In manufacturing spiral-wound cartridges, care is taken in the choice of spacers. An overly tight mesh may result in pressure drops along the feed or permeate channel that adversely affect separation performance when the cartridge is in use. Likewise, a tight spacer may facilitate the formation of stagnant boundary layers that give rise to concentration polarisation adjacent to the membrane surface. Similar issues affect the manufacture of plate-and-frame cartridges.

The preferred cartridge geometries therefore include plate-and-frame, spiral-wound, hollow-fiber, tubular and envelope type. More information on cartridge geometries can be found in "Membrane Technology in the Chemical Industry", edited by S. P. Nunes and K. V. Peinemann, page 76-78 and page 101-103 and in "Membrane Technology and Applications" (second edition), edited by R. Baker, page 139-155.

While this specification emphasises the usefulness of the membranes of the present invention for separating gases, especially polar and non-polar gases, it will be understood that the membranes can also be used for other purposes, for example providing a reducing gas for the direct reduction of iron ore in the steel production industry, dehydration of organic solvents (e.g. ethanol dehydration), pervaporation, oxygen enrichment, solvent resistant nanofiltration and vapour separation.

The composite membrane of the invention may be used in conjunction with other membranes or with other gas separation techniques if desired, e.g. with solvent absorption (e.g. Selexol, Rectisol, Sulfinol, Benfield), amine absorption (e.g. DEA, MDEA), physical adsorption, e.g. pressure swing adsorption, cryogenic techniques, etc.

The composite membranes comprising a discriminating layer are particularly suitable for separating a feed gas containing a target gas into a gas stream rich in the target gas and a gas stream depleted in the target gas. For example, a feed gas comprising polar and non-polar gases may be separated into a gas stream rich in polar gases and a gas stream depleted in polar gases. In many cases the membranes have a high permeability to polar gases, e.g. $CO_2$, $H_2S$, $NH_3$, $SO_x$, and nitrogen oxides, especially $NO_x$, relative to non-polar gases, e.g. alkanes, $H_2$, $N_2$, and water vapour.

The target gas may be, for example, a gas which has value to the user of the membrane and which the user wishes to collect. Alternatively the target gas may be an undesirable gas, e.g. a pollutant or 'greenhouse gas', which the user wishes to separate from a gas stream in order to meet product specification or to protect the environment.

The composite membranes comprising a discriminating layer are particularly useful for purifying natural gas (a mixture which predominantly comprises methane) by removing polar gases ($CO_2$, $H_2S$); for purifying synthesis gas; and for removing $CO_2$ from hydrogen and from flue gases. Flue gases typically arise from fireplaces, ovens, furnaces, boilers, combustion engines and power plants. The composition of flue gases depend on what is being burned, but usually they contain mostly nitrogen (typically more than two-thirds) derived from air, carbon dioxide ($CO_2$) derived from combustion and water vapour as well as oxygen. Flue gases also contain a small percentage of pollutants such as particulate matter, carbon monoxide, nitrogen oxides and sulphur oxides. Recently the separation and capture of $CO_2$ has attracted attention in relation to environmental issues (global warming).

The composite membranes of the invention comprising a discriminating layer are particularly useful for separating the following: a feed gas comprising $CO_2$ and $N_2$ into a gas stream richer in $CO_2$ than the feed gas and a gas stream poorer in $CO_2$ than the feed gas; a feed gas comprising $CO_2$ and $CH_4$ into a gas stream richer in $CO_2$ than the feed gas and a gas stream poorer in $CO_2$ than the feed gas; a feed gas comprising $CO_2$ and $H_2$ into a gas stream richer in $CO_2$ than the feed gas and a gas stream poorer in $CO_2$ than the feed gas, a feed gas comprising $H_2S$ and $CH_4$ into a gas stream richer in $H_2S$ than the feed gas and a gas stream poorer in $H_2S$ than the feed gas; and a feed gas comprising $H_2S$ and $H_2$ into a gas stream richer in $H_2S$ than the feed gas and a gas stream poorer in $H_2S$ than the feed gas.

Preferably the composite membrane has a $CO_2/CH_4$ selectivity ($\alpha CO_2/CH_4$)>10. Preferably the selectivity is determined by a process comprising exposing the membrane to a 13/87 mixture by volume of $CO_2$ and $CH_4$ at a feed pressure of 6000 kPa at 40° C.

The following materials were used in the Examples (all without further purification):

PAN is a porous support (polyacrylonitrile L10 ultrafiltration membrane from GMT Membrantechnik GmbH, Germany).

X-22-162C is a dual end reactive silicone having carboxylic acid reactive groups, a viscosity of 220 mm$^2$/s and a reactive group equivalent weight of 2,300 g/mol] from Shin-Etsu Chemical Co., Ltd. (MWT 4,600).

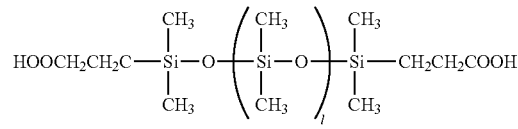

DBU is 1,8-diazabicyclo[5.4.0]undec-7-ene from Sigma Aldrich.

UV9300 is SilForce™ UV9300 from Momentive Performance Materials Holdings having an epoxy equivalent weight of 950 g/mole oxirane (MWT 9,000, determined by viscometry).

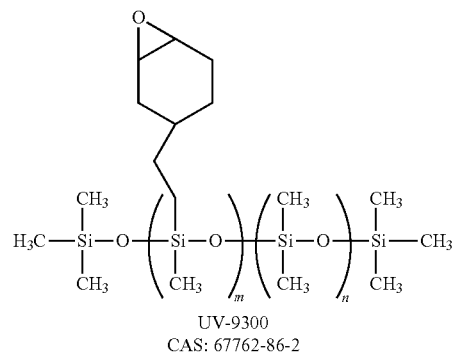

UV-9300
CAS: 67762-86-2

UV9390C is SilForce™ UV-9390C from Momentive Performance Materials Holdings.
Ti(OiPr)$_4$ is titanium (IV) isopropoxide from Sigma Aldrich.
Ti(OBu)$_4$ is titanium(IV)butoxide from Sigma Aldrich.
Ti(AcAc)$_2$(iOPr)$_2$ is titanium diisopropoxide bis(acetylacetonate) from Sigma Aldrich.
Nb(OEt)$_5$ is niobium(V)ethoxide from Sigma Aldrich.
Zr(OiPr)$_4$ is zirconium(IV)isopropoxide isopropanol complex from Sigma Aldrich.
Zr(AcAc)$_4$ is zirconium(IV)acetylacetonate from Sigma Aldrich.
n-heptane is n-heptane from Brenntag Nederland BV.
MEK is 2-butanone from Brenntag Nederland BV.
MIBK is methylisobutyl ketone from Brenntag Nederland BV.
APTMS is 3-trimethoxysilyl propan-1-amine from Sigma Aldrich.
THF is tetrahydrofuran from Brenntag Nederland BV.
PI1 is 6FDA-TeMPD$_x$/DABA$_y$, x/y=20/80; obtained from Fujifilm Corporation, having the following structure:

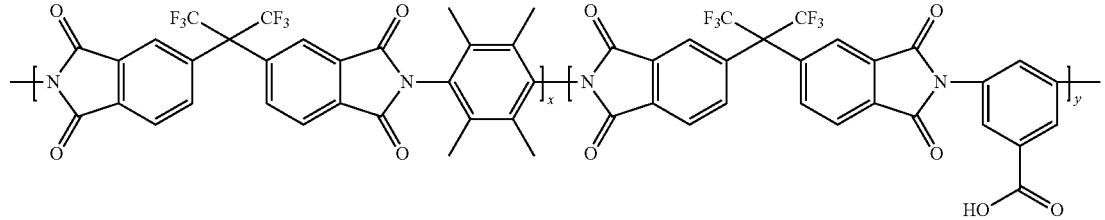

Calculation of (Total Mol$_{metal}$/g) for Example 1

As Ti(OiPr)$_4$ contains 1 mole of metal (Ti) per mole of Ti(OiPr)$_4$, the number of moles of metal per gram of polymeric layer is the same as the number of moles of Ti(OiPr)$_4$ per gram of polymeric layer. Ti(OiPr)$_4$ has a MWT of 284.07.

The number of moles of metal per gram of polymeric layer (Total Mol$_{metal}$) is therefore 0.1/5/284.07=0.0000704.

Calculation of (Total Mol$_{si}$/g) for Example 1

The polymeric layers in the Examples were obtained from polymerising a composition comprising two polymerisable components, both of which contained silicon: namely UV9300 and X-22-162C. The Total Mol$_{Si}$/g for the polymeric layer was therefore the weight average of the Mol$_{si}$/g for each of these two components.

The Mol$_{si}$/g for the part of the polymeric layer derived from UV9300 was calculated as follows:

UV9300 has a MWT of 9000 and comprises repeat units of formula (i) Si(CH$_3$)$_2$O (MWT 74.13); and (ii) Si(CH$_3$)(C$_2$H$_4$C$_6$H$_9$O)O (MWT 184.2), with each repeat unit containing one Si atom. The terminal groups are methyl and the last unit does not contain an oxygen atom. UV9300 has an average of 9.48 of the repeat units of formula (ii) per molecule (as determined from the reactive epoxy groups present in these units).

The Mol$_{Si}$/g of polymeric layer derived from UV9300 derived from its repeat units of formula (i), corrected for terminal groups and missing oxygen atom, is therefore:
((9000−(2×15.02)+(16−9.48*184.2)/74.13)/9000=0.01085 moles of silicon per gram of polymeric layer derived from UV9300.

The Mol$_{Si}$/g of polymeric layer derived from UV9300 derived from its repeat units of formula (ii), is therefore 9.48/9000=0.00105 moles of silicon per gram of polymeric layer derived from UV9300.

Therefore the Mol$_{Si}$/g of polymeric layer derived from UV9300 is (0.01085+0.00105)=0.0119 moles of silicon per gram of polymeric layer derived from UV9300.

X-22-162C has a MWT of 4600 and comprises Si(Me)$_2$O repeat groups (MWT 74.13), two terminal C$_2$H$_4$COOH groups (MWT 73.04) and one of the last repeat units does not contain an oxygen atom.

The Mol$_{Si}$/g of polymeric layer derived from X-22-162C, corrected for terminal groups and missing oxygen atom, is therefore (4600−(2×73.04)+16)/74.13/4600=0.01311 moles of silicon per gram of polymeric layer derived from X-22-162C.

Taking account of the relevant proportions of UV9300 and X-22-162C in the polymeric layer, the Total Mol$_{si}$/g of the polymeric layer is therefore (0.39078×(0.0119)+(0.10789×0.01311)/(0.39078+0.10789)=0.0122 moles of silicon per gram of polymeric layer.

Calculation of Molar Ratio of Metal:Silicon for Example 1

The polymeric layer (and the composition used to form the polymeric layer) has a molar ratio of metal:silicon of Total Mol$_{metal}$/Total Mol$_{Si}$=0.0000704/0.0122, i.e. 0.0058.

The molar ratio of metal:silicon may be calculated for the other Examples in an analogous manner.

Evaluation of Gas Flux and Selectivity (A) Gas Flux

The flux of CH$_4$ and CO$_2$ through the membranes was measured at 40° C. and gas feed pressure of 6000 kPa using a gas permeation cell with a measurement diameter of 3.0 cm and a feed gas composition of 13 v/v % CO$_2$ and 87 v/v % CH$_4$.

The flux of each gas was calculated based on the following equation:

$$Q_i=(\theta_{Perm} \cdot X_{Perm,i})/(a \cdot (P_{Feed} \cdot X_{Feed,I} - P_{Perm} \cdot X_{Perm,i}))$$

Where:
$Q_i$=Flux of each gas (m$^3$(STP)/m$^2$·kPa·s)
$\theta_{Perm}$=Permeate flow (m$^3$(STP)/s)
$X_{Perm,I}$=Volume fraction of each gas in the permeate
A=Membrane area (m$^2$)
$P_{Feed}$=Feed gas pressure (kPa)
$X_{Feed,I}$=Volume fraction of each gas in the feed
$P_{Perm}$=Permeate gas pressure (kPa)

STP is standard temperature and pressure, which is defined here as 25.0° C. and 1 atmosphere (101.325 kPa).

(B) Selectivity

The selectivity ($\alpha_{CO2/CH4}$) for the membranes was calculated from $Q_{CO2}$ and $Q_{CH4}$ calculated above, based on following equation:

$$\alpha_{CO2/CH4}=Q_{CO2}/Q_{CH4}$$

EXAMPLES 1 TO 4 AND COMPARATIVE EXAMPLE 1

Preparation of Radiation-Curable Polymers Comprising Dialkylsiloxane Groups

The components UV9300, X-22-162C and DBU in the amounts indicated in Table 2 were dissolved in n-heptane and maintained at a temperature of 95° C. for the period indicated in Table 2 to form solutions of radiation curable polymer having poly(siloxane) groups having the viscosity shown in Table 2.

Preparation of Radiation-Curable Compositions

The solutions of radiation-curable polymers were cooled to 20° C. and diluted using n-heptane to the PCP Polymer concentrations indicated in Table 2. The solutions were then filtered through a filter paper having a pore size of 2.7 µm to give radiation curable compositions. The photoinitiator UV9390C and a metal complex (Ti(OiPr)$_4$) were then added in the amounts indicated in Table 2 to give curable radiation-curable compositions.

Steps (i) and (ii)—Applying the Radiation-Curable Composition to a Porous Support & Curing to Form a polymeric Layer The abovementioned radiation-curable compositions were applied to a porous support (PAN) by spin coating and subsequently cured using a Light Hammer LH10 from Fusion UV Systems fitted with a D-bulb with an intensity of 24 kW/m and dried. This resulted in a porous support having a polymeric layer comprising a metal complex and dialkylsiloxane groups.

Step (iii)—Forming a Discriminating Layer on the Polymeric Layer

The composition for the Discriminating layer was prepared by mixing the ingredients indicated in Table 1:

TABLE 1

| | DL |
|---|---|
| PI1 (w/w %) | 1.50 |
| APTMS (w/w %) | 0.015 |
| MIBK (w/w %) | 4.50 |
| THF (w/w %) | 7.485 |
| MEK (w/w %) | 86.50 |

A discriminating layer was formed on the polymeric layer (obtained by performing steps (i) and (ii) described above) by applying the composition thereto by spin coating.

The resultant membranes had the polymeric layer thickness, $Q_{CO2}$ and selectivity indicated in Table 2. The thickness of the polymeric layer was measured by cutting through the membrane and measuring the thickness from the surface of the porous support outwards by SEM.

TABLE 2

|  |  | CEx 1 | Ex 1 | Ex 2 | Ex 3 | Ex 4 |
|---|---|---|---|---|---|---|
| Preparation of radiation-curable polymer (PCP Polymer) | UV9300 (w/w %) | 39.078 | 39.078 | 39.078 | 39.078 | 36.670 |
|  | X-22-162C (w/w %) | 10.789 | 10.789 | 10.789 | 10.789 | 13.322 |
|  | DBU (w/w %) | 0.007 | 0.007 | 0.007 | 0.007 | 0.009 |
|  | n-Heptane (w/w %) | 50.126 | 50.126 | 50.126 | 50.126 | 49.999 |
|  | Reaction time (h) | 168 | 168 | 168 | 168 | 239 |
|  | Si (meq/g polymer) | 12.2 | 12.2 | 12.2 | 12.2 | 12.2 |
|  | Viscosity of PCP polymer (mPas at 25.0° C.) | 22.8 | 22.8 | 22.8 | 22.8 | 240.6 |
| Preparation of radiation-curable composition | PCP Polymer concentration in curable composition (w/w %) | 5.00 | 5.00 | 5.00 | 5.00 | 3.50 |
|  | UV9390c (w/w %) | 0.10 | 0.10 | 0.10 | 0.10 | 0.07 |
|  | Ti(OiPr)$_4$ (w/w %) | 0 | 0.1 | 0.15 | 0.2 | 0.0788 |
|  | Ti(OiPr)$_4$ (μmol/g PCP polymer) | 0 | 70.4 | 105.6 | 140.7 | 79.3 |
|  | molar ratio of metal:silicon | 0 | 0.0058 | 0.0087 | 0.0116 | 0.0065 |
| Results | polymeric layer thickness (nm) | 200-300 | 200-300 | 200-300 | 200-300 | 200-300 |
|  | $Q_{CO2}$ (m$^3$(STP)/m$^2$ · kPa · s) | $3.49 \cdot 10^{-7}$ | $2.43 \cdot 10^{-7}$ | $1.91 \cdot 10^{-7}$ | $1.64 \cdot 10^{-7}$ | $2.56 \cdot 10^{-7}$ |
|  | Selectivity ($\alpha_{CO2/CH4}$) | 21.4 | 28.7 | 27.0 | 25.9 | 32.6 |

(Note:
CEx means Comparative Example and Ex means Example. The stated molar ratio or metal:silicon is for the radiation-curable composition and the resultant polymeric layer).

Using another recipe for the PCP polymer, several further metal complexes were tested. Results are given in Table 3.

TABLE 3

|  |  | Ex 5 | Ex 6 | Ex 7 | Ex 8 | Ex 9 |
|---|---|---|---|---|---|---|
| Preparation of radiation-curable polymer (PCP Polymer) | UV9300 (w/w %) | 47.371 | 47.371 | 47.371 | 47.371 | 47.371 |
|  | X-22-162C (w/w %) | 12.62 | 12.62 | 12.62 | 12.62 | 12.62 |
|  | DBU (w/w %) | 0.008 | 0.008 | 0.008 | 0.008 | 0.008 |
|  | n-Heptane (w/w %) | 40.00 | 40.00 | 40.00 | 40.00 | 40.00 |
|  | Reaction time (h) | 138 | 138 | 138 | 138 | 138 |
|  | Si (meq/g polymer) | 12.2 | 12.2 | 12.2 | 12.2 | 12.2 |
|  | Viscosity of PCP polymer (mPas at 25.0° C.) | 132.6 | 132.6 | 132.6 | 132.6 | 132.6 |
| Preparation of radiation-curable composition | PCP Polymer concentration in curable composition (w/w %) | 10 | 10 | 10 | 10 | 10 |
|  | UV9390c (w/w %) | 0.2 | 0.2 | 0.2 | 0.2 | 0.2 |
|  | Ti(OBu)$_4$ (w/w %) | 0.269 | 0 | 0 | 0 | 0 |
|  | Ti(AcAc)$_2$(iOPr)$_2$ (w/w %) | 0 | 0.384 | 0 | 0 | 0 |
|  | Nb(OEt)$_5$ (w/w %) | 0 | 0 | 0.252 | 0 | 0 |
|  | Zr(OiPr)$_4$ (w/w %) | 0 | 0 | 0 | 0.307 | 0 |
|  | Zr(AcAc)$_4$ (w/w %) | 0 | 0 | 0 | 0 | 0.386 |
|  | Metal complex (μmol/g PCP polymer) | 79.3 | 79.3 | 79.3 | 79.3 | 79.3 |
|  | molar ratio of metal:silicon | 0.0065 | 0.0065 | 0.0065 | 0.0065 | 0.0065 |
| Results | polymeric layer thickness (nm) | 314 | 484 | 707 | 662 | 499 |
|  | $Q_{CO2}$ (m$^3$(STP)/m$^2$ · kPa · s) | $2.57 \cdot 10^{-7}$ | $2.45 \cdot 10^{-7}$ | $2.66 \cdot 10^{-7}$ | $2.31 \cdot 10^{-7}$ | $2.38 \cdot 10^{-7}$ |
|  | Selectivity ($\alpha_{CO2/CH4}$) | 26.3 | 30.5 | 28.9 | 27.4 | 28.0 |

The thickness of the polymeric layers was determined using ellipsometry, except when indicated otherwise, as follows:
Equipment: Ellipsometer model M-2000F from J.A. Woollam Co. Inc.
Lamp: Xenon.
Software: Windows V.A.S.E.32.
Settings: as model Cauchy is chosen for all layers.
Thickness substrate (bulk): 0.17 mm
Wavelength: all wavelengths (~240-1000 nm)
Measurement angles: 50-80° in steps of 5°.
Revs/meas.: 100.

The fitting software was applied to determine the thickness of the layers as a function of refractive index.
The thickness of some Examples as determined by ellipsometry, were verified in some cases by SEM.

The invention claimed is:
1. A composite membrane comprising:
   a. a porous support; and
   b. a polymeric layer comprising dialkylsiloxane groups and a metal, the polymeric layer being present on the porous support;

c. a discriminating layer present on the polymeric layer; and
d. optionally a protective layer present on the discriminating layer wherein the polymeric layer has a molar ratio of metal: silicon of at least 0.0005.

2. The membrane according to claim 1, wherein the metal is derived from a metal complex.

3. The membrane according to claim 1, wherein the metal is selected from any one of groups 4 and 5 of the periodic table.

4. The membrane according to claim 1, wherein the metal is titanium, zirconium, hafnium, vanadium or niobium.

5. The membrane according to claim 1, wherein the discriminating layer comprises a polyimide comprising trifluoromethyl groups.

6. The membrane according to claim 1, wherein the average thickness of the discriminating layer is 20 nm to 2 μm and the polymeric layer has an average thickness of 25 to 1200 nm.

7. The membrane according to claim 1, wherein the porous support has surface pores of average diameter 0.001 to 0.1 μm.

8. The composite membrane according to claim 1 which is a composite gas separation membrane.

9. A gas separation cartridge comprising a composite membrane according to claim 1.

10. The composite membrane according to claim 1 wherein:
(a) the metal is derived from a metal complex;
(b) the metal is selected from any one of groups 4 and 5 of the periodic table;
(c) the discriminating layer comprises a polyimide comprising trifluoromethyl groups;
(d) average thickness of the discriminating layer is 20 nm to 2 μm; and
(e) the polymeric layer has an average thickness 25 to 1200 nm.

11. The composite membrane according to claim 10 which is a composite gas separation membrane.

12. The composite membrane according to claim 1 which is a composite gas separation membrane and has a pure water permeability at 20° C. of less than 6.10-8 m3/m2·s·kPa.

13. The composite membrane according to claim 10 which is a composite gas separation membrane and has a pure water permeability at 20° C. of less than 6.10-8 m3/m2·s·kPa.

14. A gas separation cartridge comprising a composite membrane according to claim 4.

15. A gas separation cartridge comprising a composite membrane according to claim 6.

16. A gas separation cartridge comprising a composite membrane according to claim 10.

17. A process for preparing a composite membrane comprising the steps:
(i) applying to a porous support a radiation-curable composition comprising a polymerisable dialkylsiloxane and a metal;
(ii) irradiating the radiation-curable composition on the support, thereby forming a polymeric layer comprising dialkylsiloxane groups and a metal on the porous support;
(iii) forming a discriminating layer on the polymeric layer; and
(iv) optionally forming a protective layer on the discriminating layer;

wherein the polymeric layer has a molar ratio of metal: silicon of at least 0.0005.

18. The process according to claim 17 wherein the radiation-curable composition comprises a metal complex and a polymerisable poly(dialkylsiloxane).

19. The process according to claim 17 which further comprises the step of forming a protective layer on the discriminating layer (step (iv)).

20. The process according to claim 19 wherein:
(a) the metal is derived from a metal complex;
(b) the metal is selected from any one of groups 4 and 5 of the periodic table;
(c) the discriminating layer comprises a polyimide comprising trifluoromethyl groups;
(d) average thickness of the discriminating layer is 20 nm to 2 μm; and
(e) the polymeric layer has an average thickness 25 to 1200 nm.

* * * * *